US010999088B2

(12) United States Patent
Iyer et al.

(10) Patent No.: US 10,999,088 B2
(45) Date of Patent: May 4, 2021

(54) PROXIMITY AND CONTEXT-BASED TELEPRESENCE IN COLLABORATIVE ENVIRONMENTS

(71) Applicant: Dell Products, L.P., Round Rock, TX (US)

(72) Inventors: Vivek Viswanathan Iyer, Austin, TX (US); Michiel Sebastiaan Emanuel Petrus Knoppert, Amsterdam (NL); Mark R. Ligameri, Santa Rosa, FL (US)

(73) Assignee: Dell Products, L.P., Round Rock, TX (US)

( * ) Notice: Subject to any disclaimer, the term of this patent is extended or adjusted under 35 U.S.C. 154(b) by 52 days.

(21) Appl. No.: 16/197,144

(22) Filed: Nov. 20, 2018

(65) Prior Publication Data

US 2020/0162274 A1    May 21, 2020

(51) Int. Cl.
| | |
|---|---|
| *H04L 12/18* | (2006.01) |
| *G06F 3/01* | (2006.01) |
| *H04L 29/06* | (2006.01) |
| *G06K 9/00* | (2006.01) |
| *H04N 7/15* | (2006.01) |
| *G06F 3/14* | (2006.01) |

(52) U.S. Cl.
CPC .......... *H04L 12/1822* (2013.01); *G06F 3/017* (2013.01); *G06F 3/1454* (2013.01); *G06K 9/00335* (2013.01); *H04L 65/4015* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 6,399,937 B1* | 6/2002 | Huang | G06K 7/10811 |
| | | | 250/201.2 |
| 2008/0192115 A1* | 8/2008 | Gindele | G06T 7/586 |
| | | | 348/140 |
| 2013/0067524 A1* | 3/2013 | Andrews | H04N 21/234363 |
| | | | 725/109 |
| 2013/0141519 A1* | 6/2013 | Sayeed | H04N 7/15 |
| | | | 348/14.08 |
| 2016/0219088 A1* | 7/2016 | Ma | H04L 47/32 |
| 2018/0098026 A1* | 4/2018 | Gadnir | H04N 5/23206 |
| 2018/0176270 A1* | 6/2018 | Griffin | G06Q 10/06314 |
| 2019/0149772 A1* | 5/2019 | Fernandes | G06F 3/04847 |
| | | | 348/159 |

* cited by examiner

*Primary Examiner* — Chris Parry
*Assistant Examiner* — Abderrahmen Chouat
(74) *Attorney, Agent, or Firm* — Fogarty LLP

(57) ABSTRACT

Embodiments of systems and methods for providing proximity and context-based telepresence in electronic collaboration environments are described. For example, an Information Handling System (IHS) may include a processor; and a memory coupled to the processor, the memory having program instructions stored thereon that, upon execution by the processor, cause the IHS to: identify a position of a participant of a collaboration session; identify a context of the participant; prioritize collaboration session content captured by the IHS based upon the position and the context of the participant; and transmit the prioritized collaboration session content to a remote IHS.

17 Claims, 6 Drawing Sheets

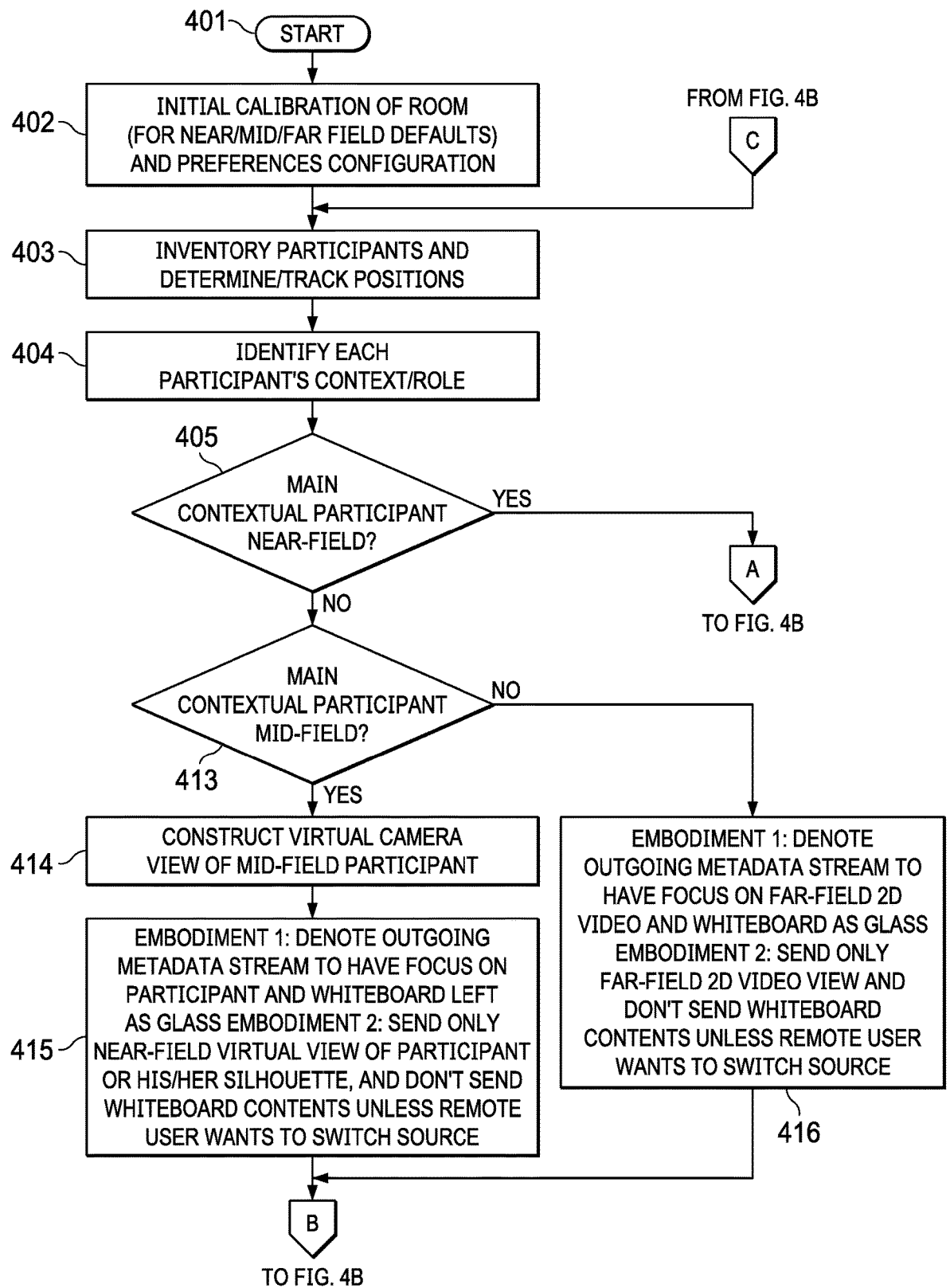

PROXIMITY AND CONTEXT-BASED TELEPRESENCE IN COLLABORATIVE ENVIRONMENTS

FIELD

This disclosure relates generally to Information Handling Systems (IHSs), and more specifically, to systems and methods for proximity and context-based telepresence in collaborative environments.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Electronic collaboration is a manner of human interaction carried out via technology-mediated communication. In many implementations, IHSs may be deployed to facilitate the establishment of "collaboration sessions" or "virtual meetings." Examples of IHS-based applications that may be invoked during such a collaboration session include video conferencing and whiteboarding. These, and other IHS-based collaboration tools, allow people to work on the same materials remotely.

The inventors hereof have recognized a need for new tools that enable better team interactions and improve effectiveness in the workplace, particularly as the workforce becomes more geographically-distributed and as the volume of business information created and exchanged increases to unprecedented levels. Unfortunately, conventional tools are fragmented, do not adequately address problems specific to real-time interactions, and do not effectively employ contextual information for gains in productivity and ease of use.

To address these, and other problems, systems and methods described herein provide proximity and context-based telepresence in collaborative environments. In various implementations, these systems and methods may enable a large-scale, in-room telepresence solutions that improve team co-creation processes across distributed locations.

SUMMARY

Embodiments of systems and methods for providing proximity and context-based telepresence in collaborative environments are described. In an illustrative, non-limiting embodiment, an Information Handling System (IHS) may include a processor and a memory coupled to the processor, the memory having program instructions stored thereon that, upon execution by the processor, cause the IHS to: identify a position of a participant of a collaboration session; identify a context of the participant; prioritize collaboration session content captured by the IHS based upon the position and the context of the participant; and transmit the prioritized collaboration session content to a remote IHS.

To identify the position, the program instructions, upon execution by the processor, may cause the IHS to classify the participant, with respect to an electronic display coupled to the IHS, as: near-field, mid-field, or far-field. To identify the context, the program instructions, upon execution by the processor, may further cause the IHS to classify the participant as at least one of: speaking, gesturing, or whiteboarding. Moreover, the collaboration session content may include video feed content, whiteboarding content, and/or overlay content.

To prioritize the collaboration session content, the program instructions may cause the IHS to transmit metadata to the other IHS with different priority indicators for each different content. Additionally, or alternatively, to prioritize the collaboration session content, the program instructions may cause the IHS to allocate different amounts of uplink bandwidth to each different content. Additionally, or alternatively, to prioritize the collaboration session content, the program instructions may cause the IHS to transmit higher priority content while withholding lower priority content.

The program instructions, upon execution by the processor, may cause the IHS to: identify the position as near-field and the context as whiteboarding; and in response, prioritize the whiteboarding content over the video content. Alternatively, the program instructions may cause the IHS to: identify the position as near-field and the context as speaking; and in response, prioritize the video feed content over the whiteboarding content. Alternatively, the program instructions may cause the IHS to: identify the position as near-field and the context as gesturing; and in response, prioritize the overlay content over the video feed content. Alternatively, the program instructions may cause the IHS to: identify the position as mid-field or far-field and the context as speaking; and in response, prioritize the video feed content over the overlay content. Alternatively, the program instructions may cause the IHS to: identify the position as mid-field or far-field and the context as gesturing; and in response, prioritize the overlay content over the video feed content.

In some cases, to prioritize the collaboration session content, the program instructions, upon execution by the processor, may cause the IHS to replace an image of the participant with a digitally generated image corresponding to the participant in the video content. For instance, the digitally generated image may include a silhouette of the participant.

In another illustrative, non-limiting embodiment a method may include: receiving, at an IHS, collaboration session content gathered by a remote IHS, where the collaboration session content comprises: video feed content, whiteboarding content, and overlay content, and where the collaboration session content is prioritized by the remote IHS according to a position and a context of a remote participant; and reproducing the collaboration session content.

In yet another illustrative, non-limiting embodiment, a hardware memory device may have program instructions stored thereon that, upon execution by a processor of an IHS, cause the IHS to: receive video feed content, whiteboarding content, and overlay content during a collaboration session; determine a position and a context of a participant of the collaboration session; prioritize each of the video feed content, the whiteboarding content, and the overlay content, in response to the position and the context; and transmit the prioritized video feed content, whiteboarding content, and overlay content to a remote IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 4A and 4B illustrate an example of a method for providing proximity and context-based telepresence during a collaboration session, according to some embodiments.

DETAILED DESCRIPTION

Figure 1A:
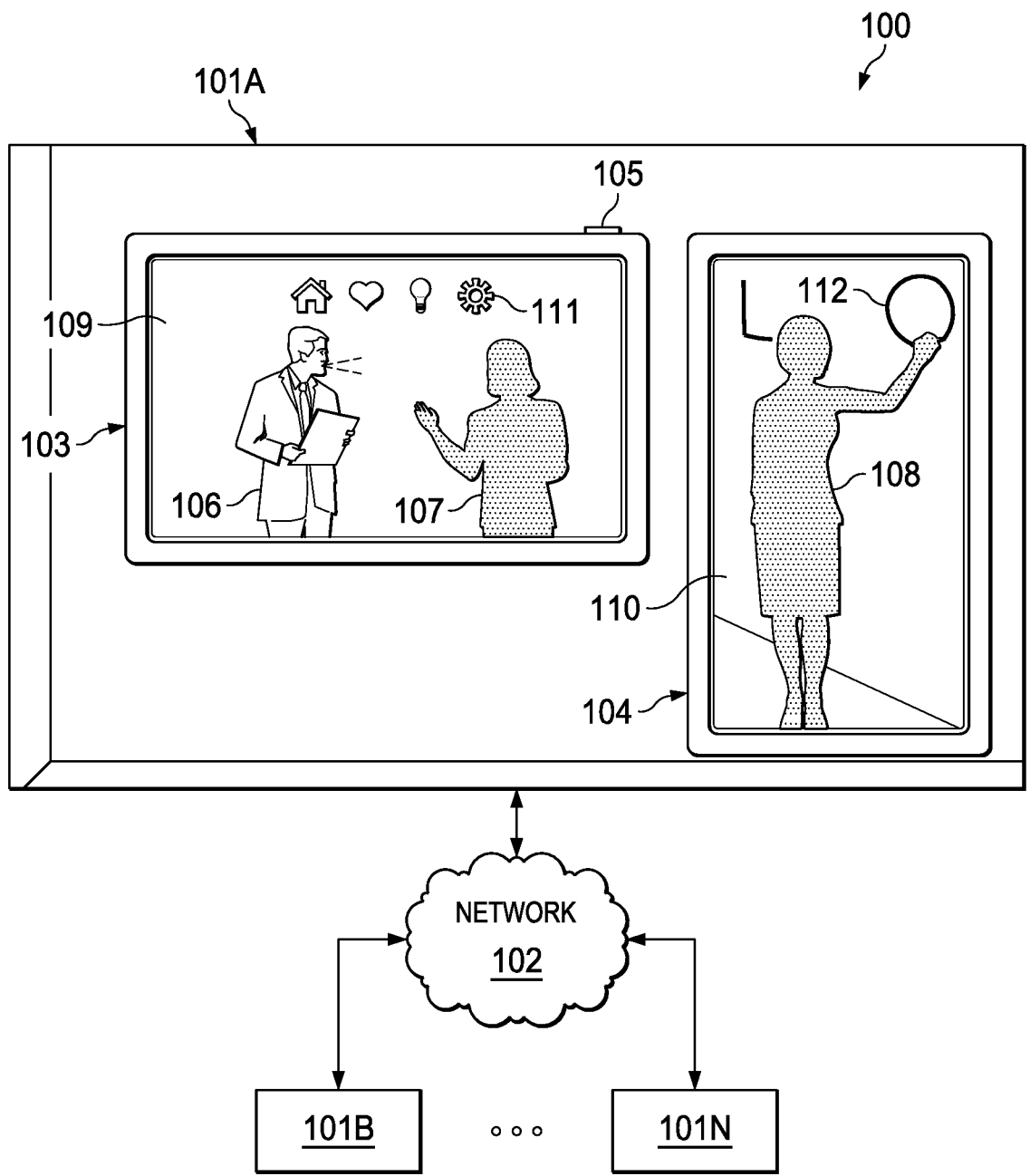
FIGS. 1A and 1B illustrate an example of a collaboration environment where systems and methods for providing proximity and context-based telepresence may be deployed, according to some embodiments.

FIG. 1A illustrates an example of collaboration environment 100 where systems and methods for providing proximity and context-based telepresence during a collaboration session may be deployed. As shown, displays 103 and 104 operate as meeting point and/or shared digital whiteboard for conference room 100A, that enable an electronic collaboration session among distributed participants operating like systems in locations 101A-N over network 102.

Figure 2:
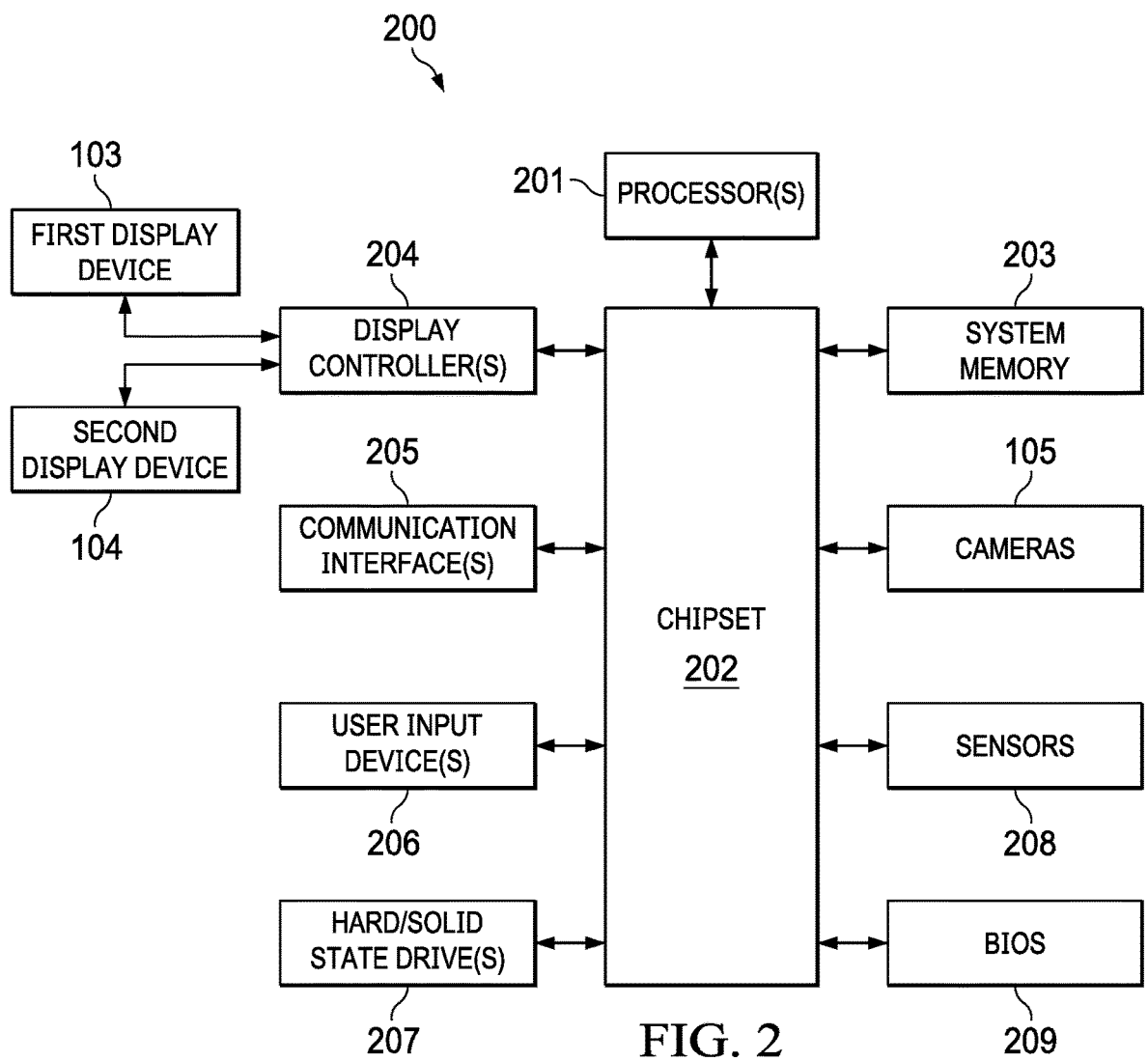
FIG. 2 illustrates an example of hardware components of an Information Handling System (IHS) configured to provide proximity and context-based telepresence during a collaboration session, according to some embodiments.

Displays 103 and 104 are operated in location 101A by IHS 200 (depicted in FIG. 2). IHS 200 is also coupled to camera(s) 105 and to a plurality of other sensors. These sensors may include but are not limited to: electric, magnetic, radio, optical, infrared, thermal, force, pressure, acoustic, ultrasonic, proximity, position, direction, movement, velocity, rotation, and/or acceleration sensor(s). Based upon data obtained from camera(s) 105 and from these various sensors, IHS 200 may manage the telepresence of one or more participants during the collaboration session.

In this example, in response to receiving prioritized content from a remote location, display 103 renders a close-up video image of speaking participant 106, a silhouette of gesturing participant 107, and augmented content 111, overlaid upon far-field video stream 109. Display 104 renders a silhouette of whiteboarding participant 108 as she produces whiteboarding content 112 over far-field video stream 110. For example, participants 106 and 107 shown in display 103 at location 101A may actually be present at location 101B, and participant 108 may be present at location 101N.

Figure 1B:
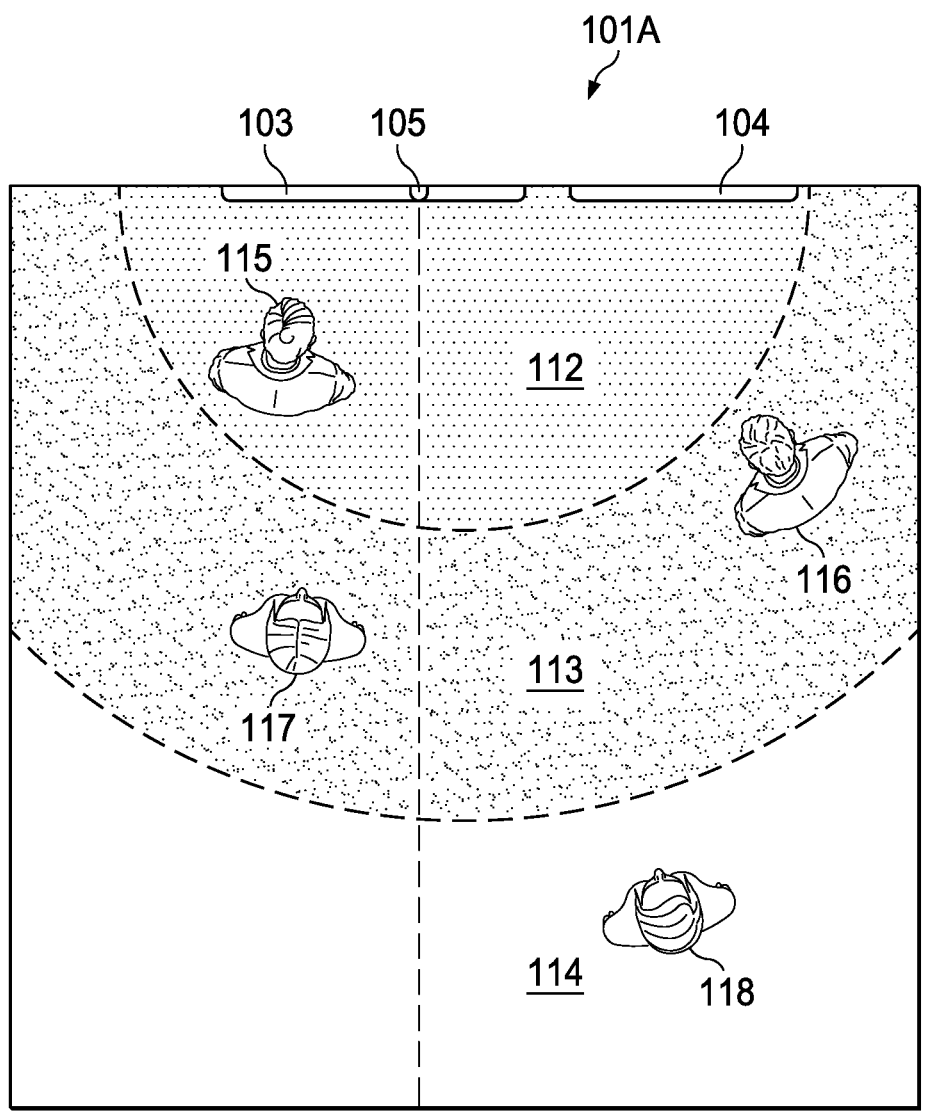

FIG. 1B shows an example of a scenario taking place in location 101A during the aforementioned collaboration session, such that location 101A is divided into three proximity zones: near-field 112, mid-field 113, and far-field 114. In this use-case, participants 115-118 are physically present in location 101A, such that participant 115 is in near-field 112, participants 116 and 117 are in mid-field 112, and participant 118 is in far-field 114.

When a remote participant (e.g., participant 108) is whiteboarding (or "inking") with a local participant (e.g., participant 115), it might become important to have displays 103/104 focus on whiteboard contents rather than the overlaid video on glass, in order for other participants that are co-located with the local participant (e.g., participants 116-118) to see the annotated content. But, when someone far-field on a conference table (e.g., participant 118) is speaking, for example, it might be more important to switch the outgoing data feed to the 2D camera far field view (or to indicate the event in outgoing metadata).

Network 102 may include one or more wireless networks, circuit-switched networks, packet-switched networks, or any combination thereof to enable communications between two or more of IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), Metropolitan Area Networks (MANs), Local Area Networks (LANs), Virtual Private Networks (VPN), the Internet, etc.), or the like.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 2 is a block diagram of hardware components of IHS 200 configured to provide proximity and context-based telepresence during a collaboration session. As depicted, IHS 200 includes processor 201. In various embodiments, IHS 200 may be a single-processor system, or a multi-processor system including two or more processors. Processor 201 may include any processor capable of executing program instructions, such as a PENTIUM series processor, or any general-purpose or embedded processor implementing any suitable Instruction Set Architectures (ISA), such as an x86 ISA or a Reduced Instruction Set Computer (RISC) ISA (e.g., POWERPC, ARM, SPARC, MIPS, etc.).

IHS 200 includes chipset 202 coupled to processor 201. In certain embodiments, chipset 202 may utilize a QuickPath Interconnect (QPI) bus to communicate with processor 201. Chipset 202 may provide processor 201 with access to a number of resources. Moreover, chipset 202 may be coupled to communication interface(s) 205 to enable communications via various wired and/or wireless networks, such as Ethernet, WiFi, BLUETOOTH, cellular or mobile networks (e.g., CDMA, TDMA, LTE, etc.), satellite networks, or the like. For example, communication interface(s) 205 may be coupled to chipset 202 via a PCIe bus.

Chipset 202 may be coupled to display controller(s) 204, which may include one or more or graphics processor(s) (GPUs) on a graphics bus, such as an Accelerated Graphics Port (AGP) or Peripheral Component Interconnect Express (PCIe) bus. As shown, display controller(s) 204 provide video or display signals to first display device 103 and second display device 202. In other implementations, any number of display controller(s) 204 and/or display devices 103/104 may be used.

Each of display devices 103 and 104 may include a flexible display that is deformable (e.g., bent, folded, rolled, or stretched) by an external force applied thereto. For example, display devices 103 and 104 may include LCD, OLED, or AMOLED, plasma, electrophoretic, or electrowetting panel(s) or film(s). Each display device 103 and 104 may include a plurality of pixels arranged in a matrix, configured to display visual information, such as text, two-dimensional images, video, three-dimensional images, etc.

Display device(s) 103/104 may be configured to sense haptic and/or physical touch events, and to generate touch information. To this end, display device(s) 103/104 may include a touchscreen matrix (e.g., a layered capacitive panel or the like) and/or touch controller configured to receive and interpret multi-touch gestures from a user touching the screen with a stylus or one or more fingers. In some cases, display and touch control aspects of display device(s) 103/104 may be collectively operated and controlled by display controller(s) 204.

Chipset 202 may also provide processor 201 and/or display controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like. System memory 203 may store program instructions that, upon execution by processor 201 and/or controller(s) 204, present a UI interface to a user of IHS 200.

Upon booting of IHS 200, processor(s) 201 may utilize Basic Input/Output System (BIOS) 209 instructions to initialize and test hardware components coupled to IHS 200 and to load an Operating System (OS) for use by IHS 200. BIOS 209 provides an abstraction layer that allows the OS to interface with certain hardware components that are utilized by IHS 200. Via the hardware abstraction layer provided by BIOS 209, software stored in memory 203 and executed by the processor(s) 201 of IHS 200 is able to interface with certain I/O devices that are coupled to the IHS 200. As used herein, the term BIOS is also intended to encompass the Unified Extensible Firmware Interface (UEFI).

Chipset 202 may also provide access to one or more user input devices 206, for example, using a super I/O controller or the like. For instance, chipset 202 may provide access to a keyboard (e.g., keyboard 103), mouse, trackpad, stylus, totem, or any other peripheral input device, including touchscreen displays 103 and 104. These input devices may interface with chipset 202 through wired connections (e.g., in the case of touch inputs received via display controller(s) 204) or wireless connections (e.g., via communication interfaces(s) 205).

Chipset 202 may further provide access to one or more hard disk and/or solid-state drives 207. In certain embodiments, chipset 202 may also provide an interface for communications with one or more sensors 208 and camera(s) 105.

Figure 3:
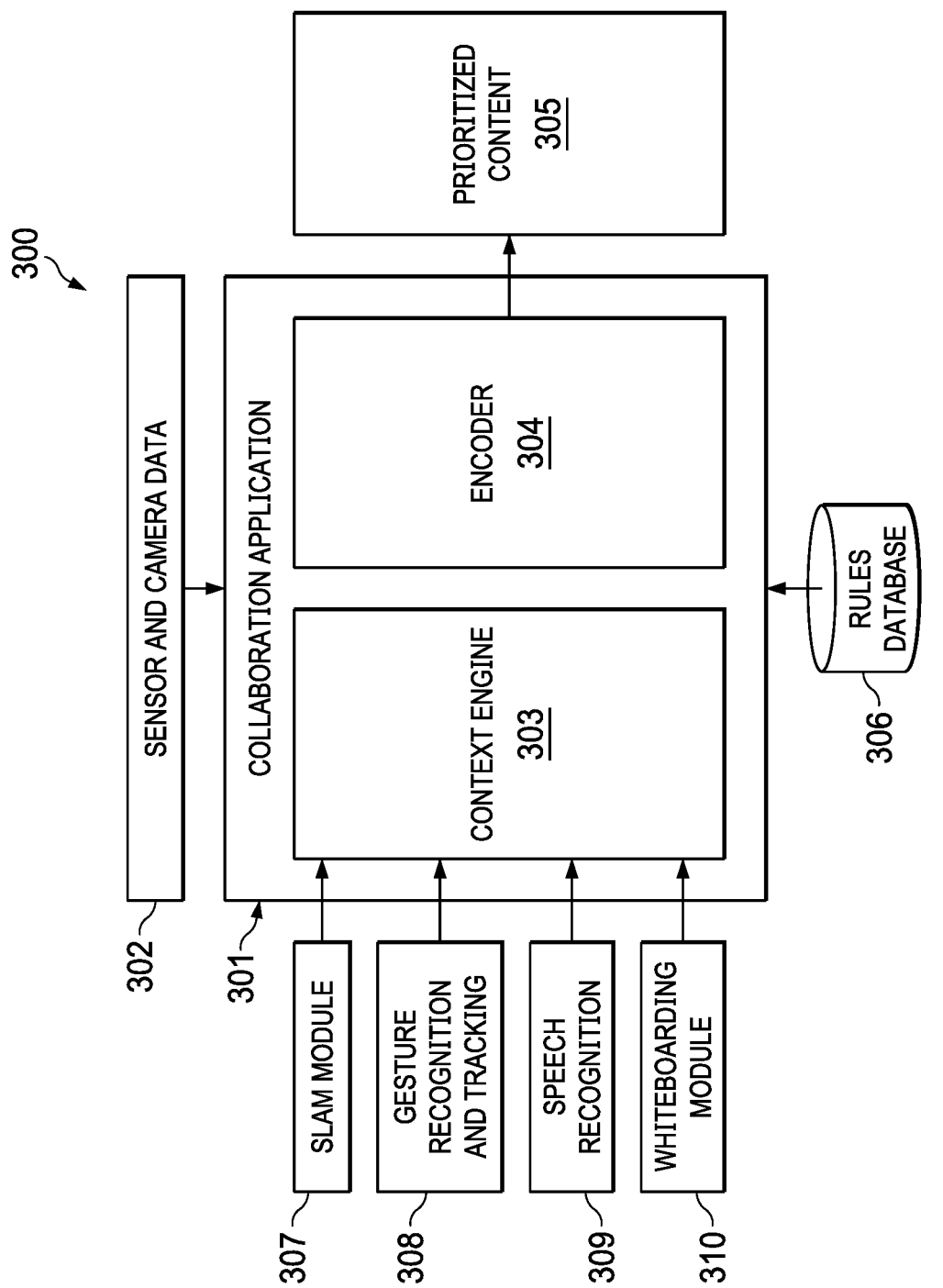
FIG. 3 illustrates an example of logic components of an IHS configured to provide proximity and context-based telepresence during a collaboration session, according to some embodiments.

FIG. 3 illustrates logic components 300 of IHS 200 configured to provide proximity and context-based telepresence during a collaboration session. In some embodiments, program instructions may be stored in system memory 203, for example, that upon execution by processor 201 of IHS 200, produces collaboration application 301. As such, IHS 200 may be configured to execute collaboration application 301 in the form of a web browser or native application.

In some embodiments, logic components 300 may manage information and content sharing in a collaboration session (e.g., video conferencing, augmented reality or design, whiteboarding, file sharing, etc.) using one or more of logic components 300. Collaboration application 301 may communicate data with another collaboration application (e.g., in location 101B), an application server, or other web services, using any suitable protocol such as, for example, Hypertext Transfer Protocol (HTTP) Secure (HTTPS).

Broadly speaking, collaboration application 301 may be configured to support a collaboration session and associated management. For example, collaboration application 301 may be configured to perform participant authentication and authorization, to detect and connect with other IHSs (e.g., peer-to-peer) or servers, to provide an Application Programming Interface (API) that enables various collaboration actions, and to broker audio and video communications, whiteboarding, and file transfers, etc. Collaboration application 301 may also handle operations such as: creating and managing meetings, linking virtual workspaces, notifying participants of invitations, providing configuration for auto calling (push/pull) participants, etc.

In various embodiments, collaboration application 301 may receive locally produced collaboration session content, such as sensor and camera data 302, and it may determine how to send that content—or what content to send—to a remote IHS. To this end, collaboration application 301 executes context engine 303, ascertains the proximity and/or context of one or more participants (based on rules database 306), and outputs prioritized collaboration session content 305 via encoder 304.

Simultaneous Localization and Mapping (SLAM) module 307 may operate based upon landmarks found in the video frames received from camera(s) 105. Particularly, SLAM module 307 may be configured to implement tracking techniques that use distinctive visual characteristics of the physical environment to identify specific images or shapes which are then usable to calculate a participant's position and pose. To this end, SLAM module 307 uses positional tracking devices among camera(s) 105 and sensor(s) 208 (e.g., in the IR spectrum).

In some cases, SLAM module 307 may include a propagation component, a feature extraction component, a mapping component, and an update component. The propagation component may receive angular velocity and/or accelerometer data, and it may use that data to produce a new position and/or pose estimation. At least one of camera(s) 105 (e.g., a depth-sensing camera) may provide video frames to the feature extraction component, which extracts useful image features (e.g., using thresholding, blob extraction, template matching, etc.), and generates a descriptor for each feature.

These features, also referred to as "landmarks," are then fed to the mapping component. The mapping component may be configured to create and extend a map, as participants move in space. Landmarks may also be sent to the update component, which updates the map with the newly detected feature points and corrects errors introduced by the propagation component.

To enable positional tracking for SLAM purposes, different positional tracking sources or devices may be used. For example, wireless tracking may use a set of anchors or lighthouses that are placed around the perimeter of a room, and/or one or more electronic totems or smart tags that are tracked; such that SLAM module 307 triangulates its position and/or state using those elements. Inertial tracking may use data from an accelerometer and/or gyroscope within a Head-Mounted Device (HMD) worn by a user, for example, to find a velocity (e.g., m/s) and position of that participant relative to an initial point. Acoustic tracking may use ultrasonic sensors to determine the position of participants by measuring time-of-arrival and/or phase coherence of transmitted and receive sound waves.

Optical tracking may include any suitable computer vision algorithm and tracking device, such as a camera of visible (RGB), IR, or NIR range, a stereo camera, and/or a depth camera. In some cases, cases, marker-less tracking may use continuous searches and feature extraction techniques from video frames obtained by camera(s) 105 (e.g., using visual odometry) to find natural visual landmarks (e.g., a window) in the environment.

An estimator, such as an Extended Kalman filter (EKF) or the like, may be used for handling the propagation component. A map may be generated as a vector stacking sensors and landmarks states, modeled by a Gaussian variable. The map may be maintained using predictions (e.g., when participants move) and/or corrections (e.g., camera 105 observes landmarks in the environment that have been previously mapped).

Gesture Recognition and Tracking (GRT) module 308 may also use one or more camera(s) 105 or optical sensors 208 that enable participants to use their actual hands for interaction with virtual objects (VOs) rendered by displays 103/104. For example, GRT module 308 may be configured to implement hand tracking and gesture recognition in a 3-D space via a user-facing 2-D camera. In some cases, GRT module 308 may track a selectable number of degrees-of-freedom (DOF) of motion, with depth information, to recognize dynamic hand gestures (e.g., swipes, clicking, tapping, grab and release, etc.) usable to control or otherwise interact with collaboration application 301.

Gesture detection begins when video frame data (e.g., a video or depth-video stream) is received from gesture or RGB camera(s) 105, and processed to identify various gestures and sequences that constitute user input. At least a portion of the user's body may be identified in the video frame data. For example, through image processing, a given locus of a video frame or depth map may be recognized as belonging to a participant. Pixels that belong to the participant (e.g., arms, hands, fingers, etc.) may be identified, for example, by sectioning off a portion of the video frame or depth map that exhibits above-threshold motion over a suitable time scale, and attempting to fit that section to a geometric model of the participant. If a suitable fit is achieved, then pixels in that section may be recognized as those of the participant.

GRT module 308 may be configured to analyze pixels of a video frame or depth map that correspond to a participant, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger.

In other embodiments, however, the use of a virtual skeleton may not be necessary. For example, in other implementations, raw point-cloud data may be sent directly to a feature extraction routine within a gesture recognition module.

Examples of one and two-handed gestures that may be recognized or tracked by GRT module 308 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

Speech recognition module 309 operates with one or more microphones (sensors 208) and it may be configured to receive, process, and recognize speech from near- and far-field sources. In many cases, speech recognition module 309 may include circuitry and/or program instructions configured to perform beamforming, echo cancellation, noise suppression, integrated audio decoding and post-processing, and/or multi-room networking and audio output. In general, speech recognition may be accomplished using: (a) a recurrent neural network (RNN), which handles audio-to-character or phoneme conversion, and (b) a language model, which converts raw character/phoneme input into grammatically correct sentences and thoughts using n-gram beam search methods.

Whiteboarding module 310 operates with one or more touchscreen or digitizers (sensors 208) built into displays 103/104. Generally, whiteboarding module 310 enables the placement of shared images, documents, or other files on shared displays 103/104. Whiteboarding module 310 also lets participants perform hand annotations, as if on a physical whiteboard. In some implementations, one or more of displays 103/104 may be frosted by manipulating its alpha channel settings, referend to as "frost" or "whiteboarding" mode, or it may be left in "glass" mode (e.g., a normal LCD display).

Context engine 303 prioritizes outgoing data stream (and incoming data stream) based upon context and proximity. As described in more detail in FIGS. 4A and 4B below, context engine 303 may be configured to: receive a set of audio and video inputs to IHS 200 as sensor and camera data 302, along with the outputs from SLAM module 307, GRT module 308, speech recognition module 309, and whiteboarding module 310; and it may provide information to encoder 304, based upon database 306, to produce prioritized content 305. As part of this process, context engine 303 and/or encoder 304 may be configured to leverage post-processing alpha channel to frost displays 103/104, to render a whiteboard with/without near-field participant silhouette/video feed, to produce a 3D virtual camera view (e.g., using switching methods), and/or to perform depth calculations for participants using camera(s) 105.

In some cases, context engine 303 may include a calibration routine to configure near, mid, and far-field distance "zones" within a room, for example, with respect to display 103 and/or camera 105. Rules database 306 may include settings, parameters, and preferences for auto-switching and/or prioritization of content based on proximity and/or context. For example, auto-switching may be enabled with a hierarchical set of rules, stored in database 306, for prioritizing ink content versus any of the various video feeds, whiteboarding content, VOs or augmented content, etc.

Once outgoing collaboration session content is prioritized by content engine 303, encoder 304 may generate metadata that indicates the prioritization to a remote IHS's decoding that content. For example, each different type of content (e.g., video feed content, whiteboarding content, and overlay or augmented content) may be attributed a score (e.g., 1 to 5, high or low, etc.) that indicates the priority of that content relative to other content, and the scores may be provided to the remote IHS in real-time during the communication session. Additionally, or alternatively, encoder 304 may selective encode and transmit higher priority content while withholding lower priority content. In some cases, outgoing data feeds may be switched on or off based on proximity/context to conserve or control uplink bandwidth.

In some cases, collaboration session content that may be individually prioritized, for transmission and/or remote display, may include, but is not limited to: a near-field video feed, a far-field video feed, an IR/NIR video feed, a depth camera video feed, shared workspace or application content, whiteboarding/inking/annotation content, and augmented content (e.g., VOs subject to gesturing commands).

Figure 4B:
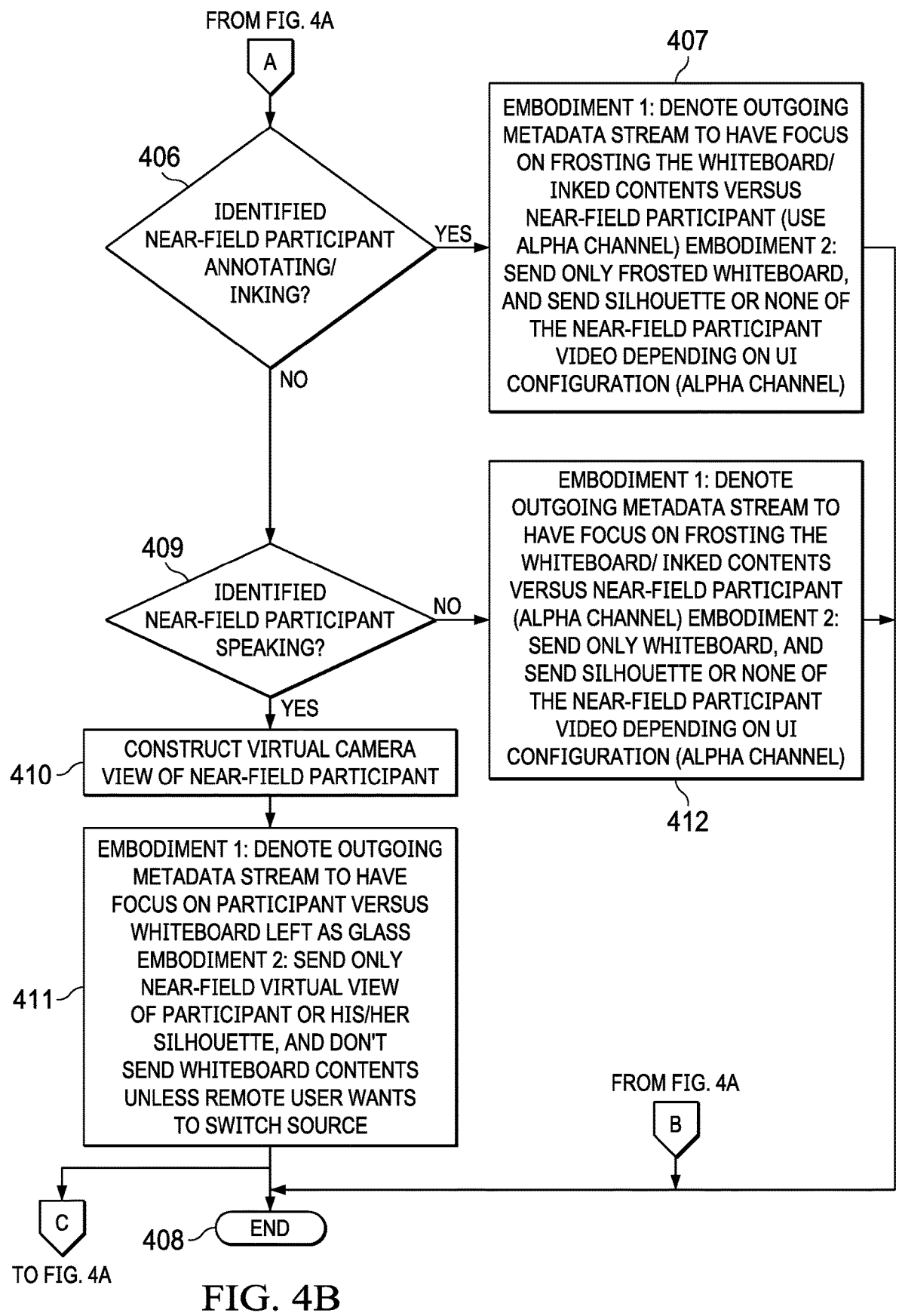

FIGS. 4A and 4B are a flowchart of method 400 for providing proximity and context-based telepresence during a collaboration session. In various embodiments, method 400 may be performed, at least in part, by operation of context engine 303 within application 301 during a collaboration session. Particularly, method 400 begins at block 401.

At block 402, method 400 performs a calibration operation for a physical room where an electronic collaboration session is to take place (e.g., a conference room or an office with displays 103/104, etc.). Block 402 also configures, in database 306, various settings, parameters, rules, and preferences discussed herein. For example, block 402 may store "proximity zones" that include a "near-field" parameter (e.g., participant <3 feet from display 103 or camera 105), a "mid-field" parameter (e.g., participant between 3 feet and 10 feet), and a "far-field" parameter (e.g., participant >10 feet).

At block 403, method 400 inventories all the participants in a room, for example, using SLAM module 307, proximity sensors, and/or by employing image processing techniques upon image frames obtained with camera(s) 105. Still as part of block 403, method 400 may determine and track the position and/or distance of each participant with respect to display 103 or camera 105, for example. In some cases, method 400 may use proximity alone to prioritize content, such that when an engaged participant is in the near field, whiteboard content is prioritized; but when the engaged participant is in the mid or far fields, video content from that location is prioritized. In those cases, block 404 may be skipped.

Otherwise, block 404 identifies each participant's role or context during the collaboration session. For example, with respect to roles, a participant may be an ordinary member of the session. A moderator may be an owner of the meeting workspace and leader that moderates the participants of the meeting. Often the moderator has full control of the session, including material content, what is displayed on the master workspace, and the invited list of participants. An editor may include a meeting participant or the moderator who has write privileges to update content in the meeting workspace. As to context, a participant may be speaking (e.g., engaging speech recognition module 309), inking (e.g., engaging whiteboarding module 310), or gesturing (e.g., engaging GRT module 308) from one or more of the proximity zones.

From block 405 on, rules from database 306 may be invoked in response to the determined position and/or context of one or more participants. Specifically, block 405 determines whether a main contextual participant is in the near-field. If so, block 406 determines whether the identified near-filed participant is also inking or annotating (e.g., engaging whiteboarding module 310). If so, in a first embodiment of block 407, encoder 304 denotes an outgoing metadata stream to prioritize the frosting of a receiving display (for a whiteboard effect using alpha channel techniques) and the transmission of whiteboarding content, over video content of the near-field participant. In a second embodiment, encoder 304 sends only the whiteboarding content and not the video feed of the participant. Additionally, or alternatively, the video of the participant may be replaced with a silhouette prior transmission of prioritized content 305.

Back at block 406, if the identified near-field participant is not inking or annotating, control passes to block 409. At block 409, method 400 determines whether the identified near-field participant is speaking. If so, at block 410 encoder 304 constructs a virtual camera view of the participant, for example, using 3D stitching techniques. At block 411, in a first embodiment, encoder 304 denotes an outgoing metadata stream to prioritize the video content of the participant, and the receiving display is instructed to stay in shared workspace or "glass" mode. In a second embodiment, encoder 304 sends only the near-field virtual view of the participant or silhouette, and withholds whiteboarding content unless otherwise instructed by the remote IHS.

Still at block 409, if the identified near-field participant is not speaking, control passes to block 412. At block 412, in a first embodiment, encoder 304 denotes an outgoing metadata stream to prioritize the frosting of a receiving display (for a whiteboard effect using alpha channel techniques) and the transmission of whiteboarding content, over video content of the near-field participant. Additionally, or alternatively, encoder 304 may prioritize the transmission and/or rendering of overlay or augmented content subject to GRT interactions (via GRT module 308). In a second embodiment, encoder 304 sends only the whiteboarding and/or overlay content, unless otherwise instructed by the remote IHS. Additionally, or alternatively, overlay content is always transmitted and/or displayed, but it may fade when it is not referenced (pointed at or interacted with by any local and/or remote participant).

Back to block 405, if the main contextual participant is not in the near-field, block 413 determines whether that participant is in the mid-field. If not, control passes to block 416. At block 416, in a first embodiment, encoder 304 denotes an outgoing metadata stream to prioritize a far-field 2D video content (e.g., from one of camera(s) 105)) and instructs the receiving display to stay in glass mode. In a second embodiment, only far-field 2D video content is transmitted, and whiteboarding content is withheld unless otherwise instructed by the remote IHS.

If block 413 determines that the main contextual is in the mid-field, block 414 constructs a virtual camera view of the participant, for example, using 3D stitching techniques. In a first embodiment of block 415, encoder 304 denotes an outgoing metadata stream to prioritize the video content of the participant, and the receiving display is instructed to stay in shared workspace or "glass" mode. In a second embodiment, encoder 304 sends only the near-field virtual view of the participant or silhouette, and withholds whiteboarding content unless otherwise instructed by the remote IHS. In some cases, blocks 403-416 may be repeated periodically (e.g., every N milliseconds), for the duration of the collaboration session.

Examples of other content prioritization actions include, but are not limited to: frosting of an entire or a portion of a receiving display (e.g., to emphasize ongoing whiteboarding operations), fading of overlaid VOs (e.g., when not referenced by gesturing for a threshold duration), fading of far-field video around a participant's displayed image (e.g., when a near-field participant is active), fading of near-field video of a participant's image (e.g., when a far-field participant is active), replacing a participant's body image with a silhouette or contour of that participant (e.g., to provide a replacement image for the participant), etc. Any of these actions may be performed in response to a participant entering or leaving a selected proximity region (e.g., near, mid, or far-field) and/or engaging in any selected contextual activity (e.g., inking, speaking, gesturing, etc.). Moreover, in some cases, content prioritization may follow different rules depending upon whether the content is to be displayed in display 103 or 104. For example, display 103 may provide an interactive screen with whiteboarding capabilities, and display 104 may provide a non-interactive video feed.

Accordingly, systems and methods described herein may provide proximity-based, intelligent prioritization of content in near/mid/far-field video layers (3D/2D), and/or action of inking in whiteboard mode or glass mode depending on context. Prioritizing collaboration session content and/or sending only what is being focused on may result in compute and/or bandwidth optimizations (for uplink/downlink) and on local and/or remote IHSs. In some cases, a 3D stitching and other graphical operations may be performed with machine learning algorithms.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a sensor; and
a memory coupled to the processor, the memory having program instructions stored thereon that, upon execution by the processor, cause the IHS to:
identify a position of a participant of a collaboration session using data obtained from the sensor;
classify the participant based upon the position of the participant with respect to an electronic display coupled to the IHS, as: near-field, mid-field or far-field, wherein near-field is when the participant is less than 3 feet from the electronic display, mid-field is when the participant is between 3 feet and 10 feet from the electronic display, and far-field is when the participant is more than 10 feet from the electronic display;
identify a context of the participant;
prioritize collaboration session content captured by the IHS based upon the position and the context of the participant; and
transmit the prioritized collaboration session content to a remote IHS.

2. The IHS of claim 1, wherein to identify the context, the program instructions, upon execution by the processor, further cause the IHS to classify the participant as at least one of: speaking, gesturing, or whiteboarding.

3. The IHS of claim 2, wherein the collaboration session content further comprises video feed content, whiteboarding content, and overlay content.

4. The IHS of claim 3, wherein to prioritize the collaboration session content, the program instructions, upon execution by the processor, further cause the IHS to transmit metadata to the remote IHS with different priority indicators for each different content.

5. The IHS of claim 3, wherein to prioritize the collaboration session content, the program instructions, upon execution by the processor, further cause the IHS to allocate different amounts of uplink bandwidth to each different content.

6. The IHS of claim 3, wherein to prioritize the collaboration session content, the program instructions, upon execution by the processor, further cause the IHS to transmit higher priority content while withholding lower priority content.

7. The IHS of claim 3, wherein the program instructions, upon execution by the processor, further cause the IHS to:
identify the position as near-field and the context as whiteboarding; and
in response, prioritize the whiteboarding content over the video content.

8. The IHS of claim 3, wherein the program instructions, upon execution by the processor, further cause the IHS to:
identify the position as near-field and the context as speaking; and
in response, prioritize the video feed content over the whiteboarding content.

9. The IHS of claim 3, wherein the program instructions, upon execution by the processor, further cause the IHS to:
identify the position as near-field and the context as gesturing; and
in response, prioritize the overlay content over the video feed content.

10. The IHS of claim 3, wherein the program instructions, upon execution by the processor, further cause the IHS to:
identify the position as mid-field or far-field and the context as speaking; and
in response, prioritize the video feed content over the overlay content.

11. The IHS of claim 3, wherein the program instructions, upon execution by the processor, further cause the IHS to:
identify the position as mid-field or far-field and the context as gesturing; and
in response, prioritize the overlay content over the video feed content.

12. The IHS of claim 3, wherein to prioritize the collaboration session content, the program instructions, upon execution by the processor, further cause the IHS to replace an image of the participant with a digitally generated image corresponding to the participant in the video content.

13. The IHS of claim 12, wherein the digitally generated image comprises a silhouette of the participant.

14. A method, comprising:
receiving, at an Information Handling System (IHS), collaboration session content gathered by a remote IHS, wherein the collaboration session content comprises: video feed content, whiteboarding feed content from a touchscreen display, and overlay content from at least one sensor, and wherein the collaboration session content is prioritized by the remote IHS according to a position using data obtained from at least one sensor and a context of a remote participant, wherein the position is selected from the group consisting of: near-field, mid-field, and far-field, wherein near-field is when the participant is less than 3 feet from the touchscreen display, mid-field is when the participant is between 3 feet and 10 feet from the touchscreen display, and far-field is when the participant is more than 10 feet from the touchscreen display; and
reproducing the collaboration session content.

15. The method of claim 14, wherein the context is selected from the group consisting of: speaking, gesturing, and whiteboarding.

16. A hardware memory device having program instructions stored thereon that, upon execution by a processor of an Information Handling System (IHS), cause the IHS to:
receive video feed content, whiteboarding feed content from a touchscreen display, and overlay content during a collaboration session;
determine a position and a context of a participant within the video feed content of the collaboration session, wherein the position is selected from the group consisting of: near-field, mid-field, and far-field, wherein near-field is when the participant is less than 3 feet from the touchscreen display, mid-field is when the participant is between 3 feet and 10 feet from the touchscreen display, and far-field is when the participant is more than 10 feet from the touchscreen display;
prioritize each of the video feed content, the whiteboarding content, and the overlay content, in response to the position and the context; and
transmit the prioritized video feed content, whiteboarding content, and overlay content to a remote IHS.

17. The hardware memory device of claim 16, wherein the context is selected from the group consisting of: speaking, gesturing, and whiteboarding.

* * * * *